United States Patent
Byun

(10) Patent No.: US 9,385,353 B2
(45) Date of Patent: Jul. 5, 2016

(54) BATTERY PACK AND METHOD OF MANUFACTURING THE SAME

(75) Inventor: Bo-Hyun Byun, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 283 days.

(21) Appl. No.: 13/368,209

(22) Filed: Feb. 7, 2012

(65) Prior Publication Data

US 2013/0034763 A1 Feb. 7, 2013

Related U.S. Application Data

(60) Provisional application No. 61/514,674, filed on Aug. 3, 2011.

(51) Int. Cl.
| | |
|---|---|
| *H01M 2/10* | (2006.01) |
| *H01M 2/02* | (2006.01) |
| *H01M 2/00* | (2006.01) |
| *H01M 2/04* | (2006.01) |

(52) U.S. Cl.
CPC ............ *H01M 2/1061* (2013.01); *H01M 2/00* (2013.01); *H01M 2/0207* (2013.01); *H01M 2/0217* (2013.01); *H01M 2/04* (2013.01); *Y10T 29/4911* (2015.01)

(58) Field of Classification Search
CPC ... H01M 2/00; H01M 2/0207; H01M 2/0217; H01M 2/04; H01M 2/1061; Y10T 29/4911
USPC .................... 429/96, 100, 120, 163
See application file for complete search history.

(56) References Cited

U.S. PATENT DOCUMENTS

| | | | | |
|---|---|---|---|---|
| 2,514,056 | A * | 7/1950 | Hatfield | 180/68.5 |
| 6,743,546 | B1 * | 6/2004 | Kaneda et al. | 429/127 |
| 6,926,164 | B1 * | 8/2005 | Broadhead et al. | 220/230 |
| 7,597,995 | B2 | 10/2009 | Yamauchi et al. | |
| 2004/0251872 | A1 * | 12/2004 | Wang et al. | 320/112 |
| 2006/0266542 | A1 | 11/2006 | Yoon | |
| 2007/0020516 | A1 * | 1/2007 | Yoon | 429/152 |
| 2008/0292956 | A1 * | 11/2008 | Hong et al. | 429/164 |

(Continued)

FOREIGN PATENT DOCUMENTS

| | | |
|---|---|---|
| KR | 10-0704290 B1 | 3/2007 |
| KR | 10-2007-00042030 A | 4/2007 |

(Continued)

OTHER PUBLICATIONS

SIPO Office Action issued on Jun. 19, 2015 in connection with Chinese Patent Application Serial No. 201210272698.3 which corresponds to the subject US. Application.

*Primary Examiner* — Jonathan Jelsma
*Assistant Examiner* — Omar Kekia
(74) *Attorney, Agent, or Firm* — Robert E. Bushnell, Esq.

(57) ABSTRACT

A battery pack and a method of manufacturing the battery pack, to include a pouch battery cell and a casing frame to accommodate and securely surround the battery cell. The casing frame may be constructed with a base frame, a first lateral frame protruding from one edge of the base frame, and a wing portion that is rotatable with respect to the base frame. The wing portion rotates from a first position where the battery cell can be inserted into the casing frame, to a second position where the battery cell is surrounded by and secured within the casing frame against damage from external forces, impulses and impacts.

16 Claims, 8 Drawing Sheets

(56) References Cited

U.S. PATENT DOCUMENTS

2009/0087692 A1   4/2009   Park et al.
2009/0111018 A1   4/2009   Park et al.
2011/0129695 A1   6/2011   Baek et al.

FOREIGN PATENT DOCUMENTS

KR   20-2009-003599 U   4/2009
WO   WO 2010/081083   *   7/2010   .............. H01M 6/42

* cited by examiner

BATTERY PACK AND METHOD OF MANUFACTURING THE SAME

CLAIM OF PRIORITY

This application makes reference to, incorporates the same herein, and claims all benefits accruing under 35 U.S.C. §119 from a provisional application for BATTERY PACK AND METHOD OF MANUFACTURING THE SAME earlier filed in United States Patent and Trademark Office on the 3$^{rd}$ of August 2011, and there duly assigned Provisional Application No. 61/514,674.

BACKGROUND OF THE INVENTION

1. Field of the Invention

One or more embodiments of the present invention relate to a battery pack and a method of manufacturing the same, and more particularly, to a battery pack that is a chargeable/dischargeable secondary battery, and a method of manufacturing the same.

2. Description of the Related Art

Secondary batteries are used in a variety of technical fields across a variety of industries due to their advantages. Such secondary batteries are widely used as energy sources in mobile electronic devices, such as digital cameras, cellular phones, or laptop computers, are also used as energy sources in hybrid electric vehicles, and are proposed as a solution to environmental contamination caused by gasoline and diesel internal combustion engines that use fossil fuels.

The operational efficiency and the electrical integrity of a secondary battery is vulnerable to damage by external shock, impact or impulse such as when the battery is dropped, can damage the battery cell. An attempt to overcome this problem is to form a frame about the battery to protect the battery cell from external shock. Various techniques and cases have been recently tried in an effort to minimize the risk of such damage; these are considered to be unsatisfactory for the reasons discussed in this specification.

The aforementioned description of the related art is technical information that is retained by the inventor so as to derive the invention or that is obtained by the invention when the inventor derives the invention, so that the technical information may not be prior art under 35 U.S.C. §102.

SUMMARY OF THE INVENTION

There is therefore, a need for an improved design for a battery frame and an improved method of making a battery pack that overcomes the detrimental effects attributable to the injection molding of hot resin, and to provide a manufacturing process that results in a simple and effective design method of making to protect the battery cell from external shock.

One or more embodiments of the present invention include a battery pack having improved shock resistance and easy assembly, and a method of manufacturing the battery pack.

Additional aspects will be set forth in part in the description which follows and, in part, will be apparent from the description, or may be learned by practice of the embodiments presented.

According to one or more embodiments of the present invention, a battery pack includes a pouch type battery cell and a casing frame to accommodate and surround the battery cell, the casing frame including a base frame corresponding to a first main surface of the battery cell, a first lateral frame protruding from one edge of the base frame and corresponding to a narrow lateral surface of the battery cell that extends along an entire length of a longest dimensional direction of the battery cell. The first lateral frame includes a hinge portion extending along an entire length of the longest dimensional direction of the battery cell and a wing portion having one side connected along the length of that side, to the lateral frame by the hinge portion. The wing portion is rotatable with respect to the base frame between a first position to enable the battery cell to be inserted into and removed from the casing frame, and a second position where the battery cell is surrounded by and secured within the casing frame.

The hinge portion may allow for the rotational operation of the wing portion. The wing portion to cover a portion of the narrow, lateral surface of the battery cell and an adjoining portion of a second major surface of the battery cell that is opposite to the first major surface of the battery cell. The wing portion may include a rounded curved surface that mates with a corresponding rounded curved surface of the battery cell that extends along an entire length of a longest dimensional direction of the battery cell when in the second position.

The casing frame may also include a second lateral frame arranged on an opposite side of the base frame from the first lateral frame to face the first lateral frame. The first and second lateral frames surround first and second long, narrow lateral surfaces, respectively of the battery cell. The second lateral frame may include a hinge portion extending along a length of the second lateral frame, and a wing portion may be attached to the hinge portion and be rotatable with respect to the length of the base frame. The base frame of the casing frame may include an opening area to expose a portion of the first main surface of the battery cell, the battery pack may also include a reinforcement plate arranged on the exposed portion of the first main surface of the battery cell.

The casing frame may further include first and second cover frames that face each other and that protrude from the base frame to cover third and fourth lateral surfaces of the battery cell that are narrower and shorter than the first and second lateral surfaces. Each of the first and second cover frames may protrude from the base frame by different heights. The casing frame may also include a stopper arranged on the second cover frame to prevent the battery cell from escaping from the casing frame.

The hinge portion may be one of a thin portion with a minimum thickness in the first lateral portion of the casing frame or a cut portion that is cut to a surface of the first lateral portion of the casing frame. The battery pack may also include an outer cover attached along a circumference of the casing frame that accommodates the battery cell. The outer cover may be wound about the circumference of the casing frame in a direction parallel to a direction of rotation of the wing portion.

According to another aspect of the present invention, there is provided a method for assembling a battery pack by preparing a pouch type battery cell and by preparing a casing frame that accommodates, embraces and surrounds the battery cell. The casing frame may include abase frame and a lateral frame extending from one edge of the base frame. The lateral frame may include a wing portion arranged along a length of the lateral frame and along a length of only one edge of the battery cell with the wing portion being rotatable with respect to the base frame between a first position that allows for insertion and removal of a battery cell into and out of the casing frame, and a second position where the battery cell is secured within the casing frame by placing the battery cell into the casing frame when the wing portion is opened in the first position, rotating the wing portion from the first position to the second position to thereby encase and thereby secure the battery cell within the casing frame and attaching an outer cover about a circumference of the casing frame that accommodates the battery cell within. The method may also include attachment of a reinforcement plate to a portion of a main surface of the battery cell that is exposed by an opening in the base frame of the casing frame before the attachment of the outer cover to the casing frame. In the attachment of the outer cover, the outer cover may be wound about a circumference of the casing frame in a direction parallel to a direction of a rotational displacement of the wing portion in going from the first position to the second position.

According to yet another aspect of the present invention, there is provided a battery pack that includes a pouch type battery cell having two major surfaces opposite to each other and four lateral surfaces disposed about a circumference of the battery cell between the two major surfaces and a casing frame to accommodate, surround and embrace the battery cell. The casing frame may include a base frame corresponding to one of the two major surfaces of the battery cell, two lateral frames extending from opposing edges of the base frame, the two lateral frames each including a wing portion that is rotatable with respect to the base frame. Each wing portion may have a length that corresponds to a length of two opposing and longest of the four lateral surfaces of the battery cell with each wing portion to rotate from a first position where the battery cell can be inserted into and removed from the casing frame to a second position where the battery cell is surrounded by and secured within the casing frame.

Each of the two lateral frames may also include a hinge portion, each wing portion being supported on the corresponding hinge portion, the hinge portion to allow for the rotational operation of the wing portion. Each hinge portion may include a thin portion having a thickness less than remaining portions of the corresponding lateral frame. Each hinge portion may include a cut portion such as a notch, that is cut from an inner surface of the corresponding lateral portion and include a pivot at an outer surface of the lateral portion at a location that corresponds to the cut portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
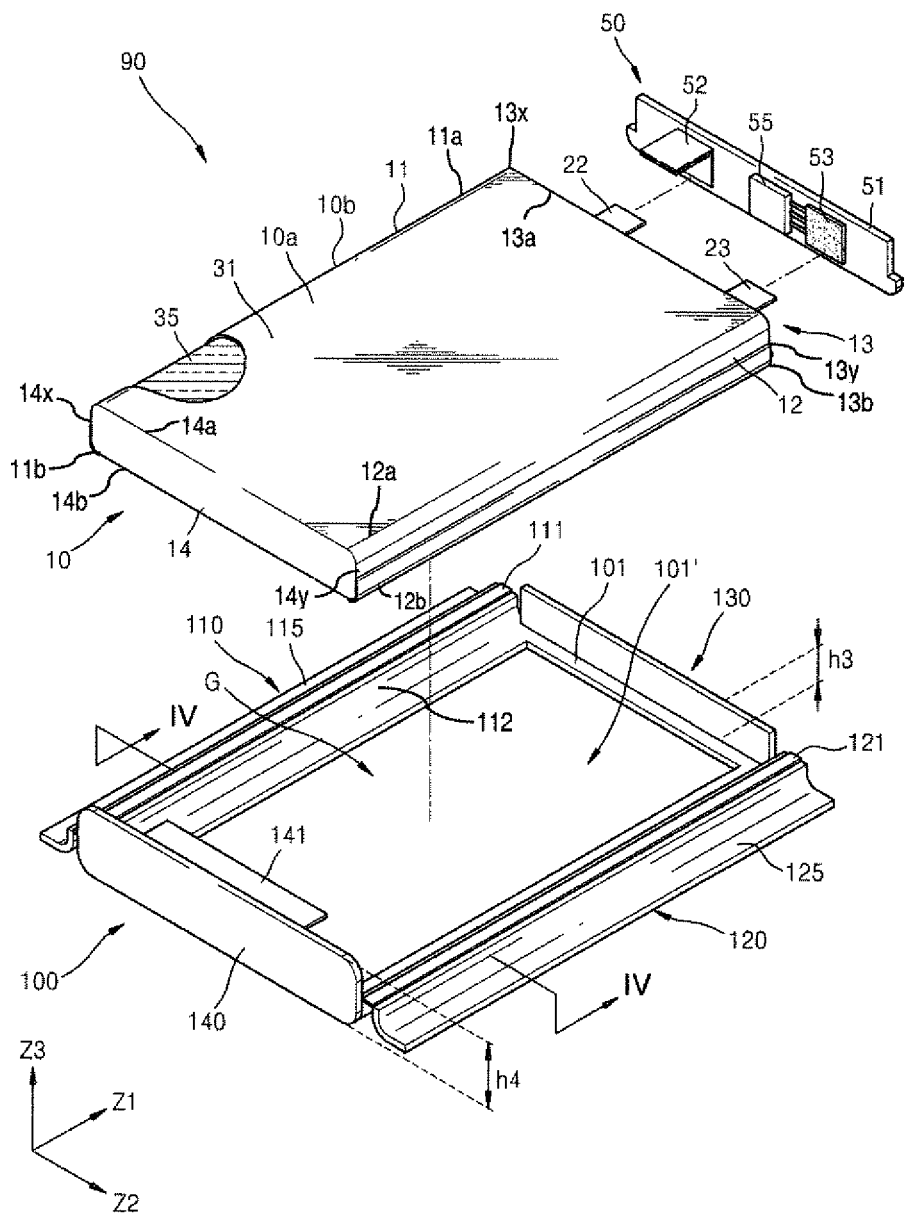
FIG. 1 is an exploded assembly view of a battery pack constructed as an embodiment of the present invention.

A secondary battery is vulnerable in that external shock, such as when the battery is dropped, can damage the battery cell. An attempt to overcome this problem is to form a frame about the battery to protect the battery cell from external shock. When such a frame is formed during the manufacturing process however, a gap between the battery cell and the frame should be filled by the addition of a substance such as a formation resin, that must be injected while heated to a very high temperature, into the gap so that the frame will combined with, or closely adhered to, the battery cell. As the temperature of the formation resin that is injected, is approximately 240° C., the battery cell is likely to become thermally damaged, and additional formation resin will need to be injected during a subsequent injection step, resulting in the working efficiency of the manufacturing process being lowered and the operational efficiency of the resulting battery cell to be substandard.

Reference will now be made in detail to various aspects and features of embodiments of the principles of the present invention, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
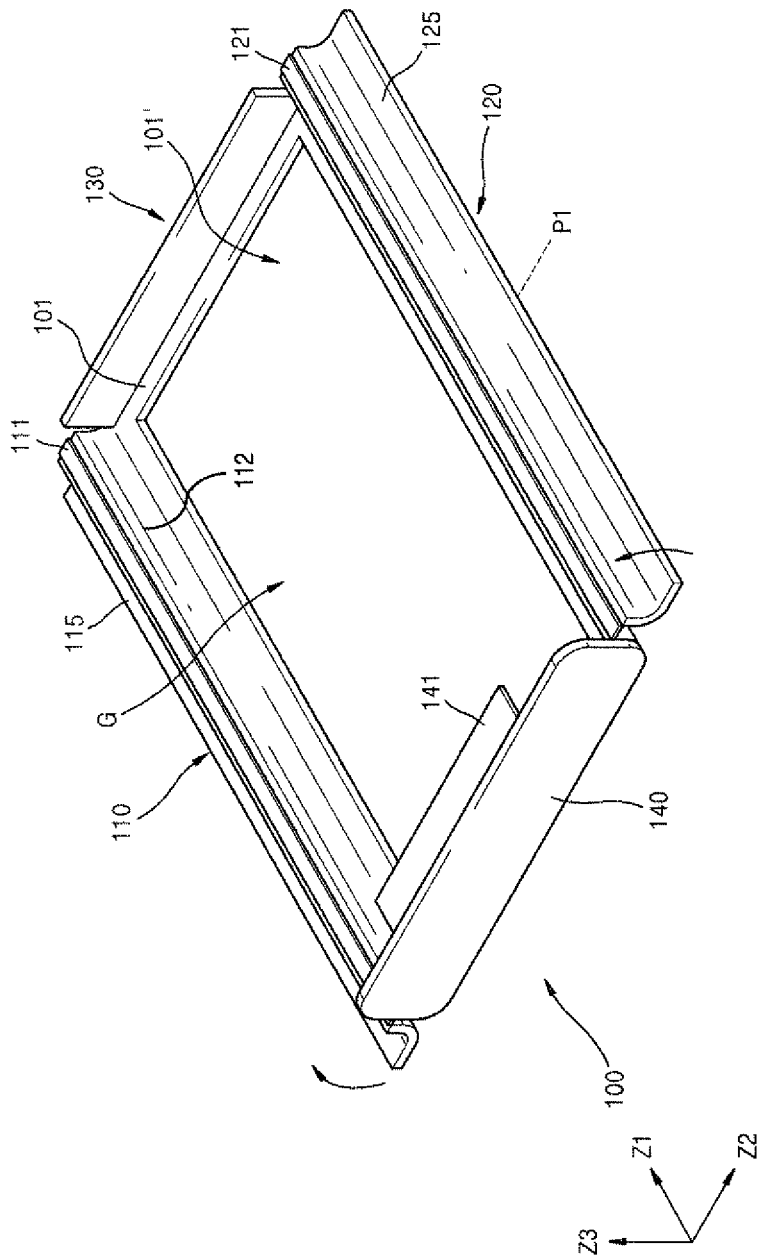
FIGS. 2 and 3 are oblique views illustrating a rotational operation between first and second positions of wing portions of a casing frame illustrated in FIG. 1.
Figure 3:
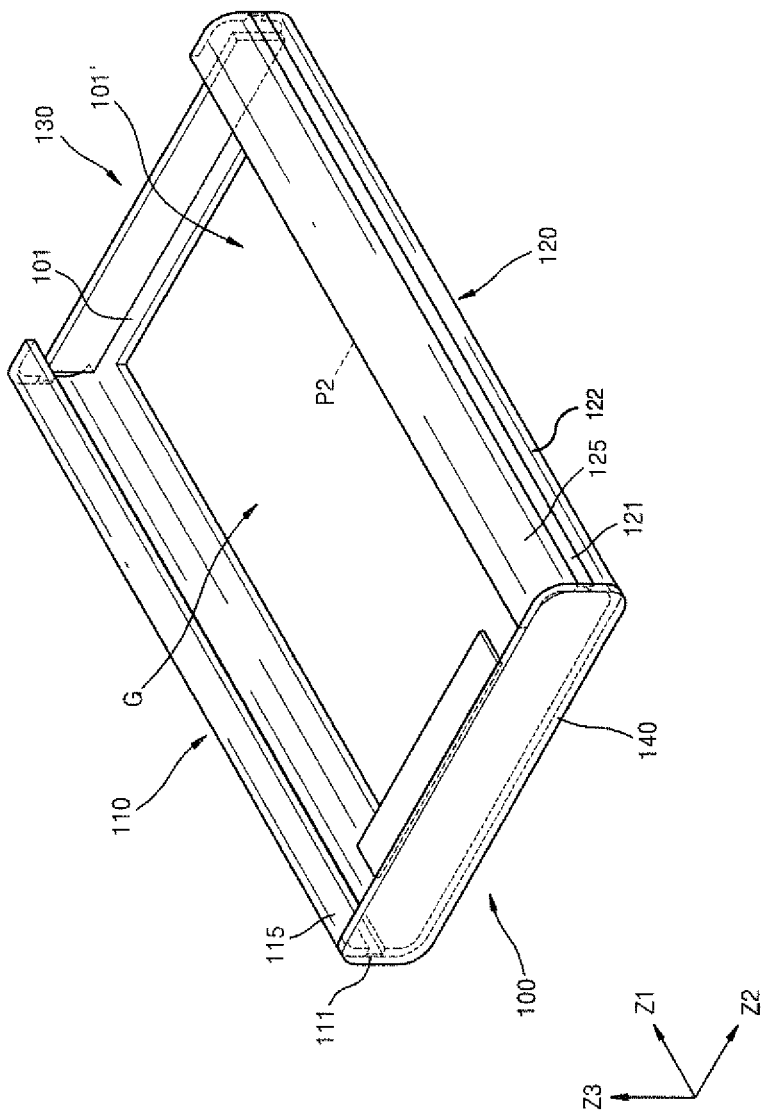
Figure 4:
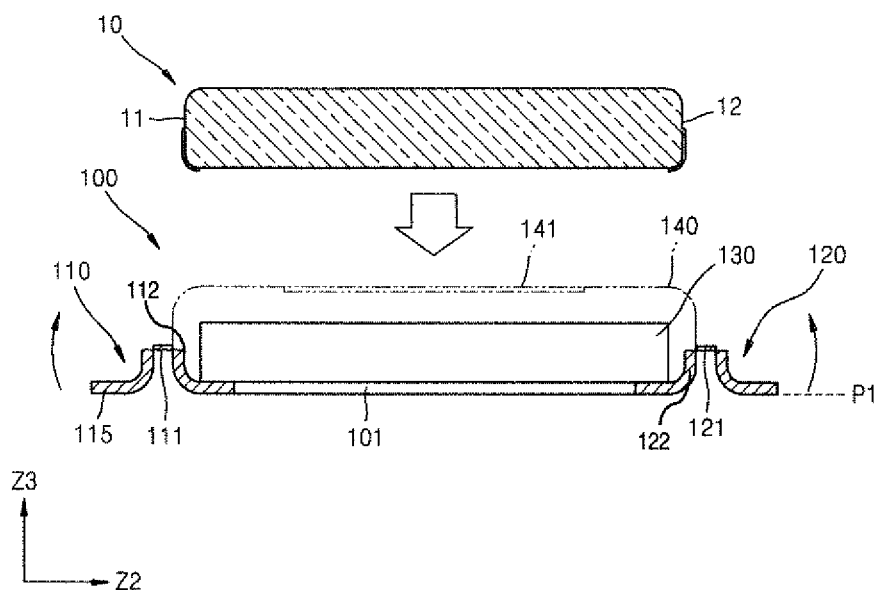
FIGS. 4 and 5 are cross-sectional views taken along a line IV-IV' of FIG. 1, which illustrate a rotational operation between the first and second positions of the wing portions of the casing frame of FIG. 1.
Figure 5:
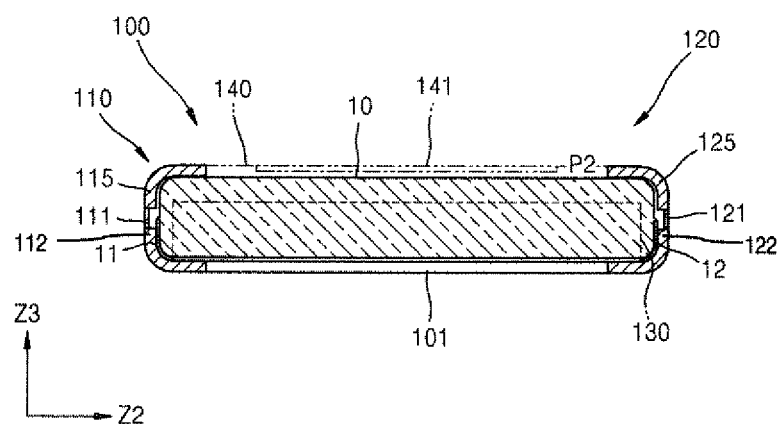

Turning now to FIGS. 1 through 5, FIG. 1 is an exploded assembly view of a battery pack 90 constructed as an embodiment of the present invention, FIGS. 2 and 3 are oblique views illustrating a rotational operation between first and second positions of a casing frame illustrated in FIG. 1 and FIGS. 4 and 5 are cross-sectional views taken along a line IV-IV' of FIG. 1 which illustrate the rotational operation that occurs during an assembly when wing portions 115, 125 are rotated between the first and second positions of the casing frame of FIG. 1.

Referring to FIG. 1, the battery pack 90 includes a battery cell 10 and a casing frame 100 that accommodates the battery cell 10. The battery cell 10 is a pouch type battery cell and includes a flexible sealing member 31 for sealing an electrolyte (not shown) as well as an electrode assembly 35 within the battery cell 10.

The sealing member 31 may be made from a flexible material and may be, for example, a laminated sheet having a multi-layer structure. For example, the sealing member 31 may be a flexible sheet including a metallic foil, such as aluminum, and an electrically insulating film stacked on both sides of the metallic foil. The sealing member 31 may seal the electrode assembly 35 within so that electrode leads, for example, an anode lead 22 and a cathode lead 23, that are electrically connected to the electrode assembly 35, may be exposed on the exterior of battery pack 90.

Although not shown, the electrode assembly 35 may have various arrangements, such as a stack electrode assembly in which an anode plate (not shown) and a cathode plate (not shown) are alternately stacked by interposing a separator (not shown) between the anode plate (not shown) and the cathode plate (not shown), thereby separating the anode plate (not shown) and the cathode plate (not shown) from each other, and a winding electrode assembly wound in the form of a jelly roll by interposing a separator (not shown) between a sheet-shaped anode plate (not shown) and a sheet-shaped cathode plate (not shown).

For example, the battery cell 10 may be shaped approximately as a rectangular parallelepiped. The battery cell 10 may include first and second main sides 10a and 10b that correspond to major surfaces of the battery cell and have relatively large widths, first and second lateral portions 11 and 12 that extend in a relatively longer-side direction (Z1-direction) of the first and second main sides 10a and 10b, and third and fourth lateral portions 13 and 14 that extend in a relatively shorter-side direction (Z2-direction) perpendicularly to the first and second main sides 10a and 10b. Here, Z1 indicates the longitudinal dimension of the battery cell 10, which is the longest dimensional direction of battery cell 10, Z2 denotes a shorter width direction of battery cell 10, and Z3 denotes a direction of an even shorter thickness dimension of the battery cell, where Z1, Z2 and Z3 are mutually perpendicular directions.

For example, the first and second lateral portions 11 and 12 may include relatively longer-side edges along opposite sides of the first and second main sides 10a and 10b and relatively longer lateral sides that extend in the relatively longer-side direction (Z1-direction) of the first and second main sides 10a and 10b. For example, the third and fourth lateral portions 13 and 14 may include relatively shorter-side surfaces on another two opposite sides of the first and second main sides 10a and 10b and relatively shorter lateral sides that extend in the relatively shorter-side direction (Z2-direction) of the first and second main sides 10a and 10b.

For example, the first and second lateral portions 11 and 12 may have curved surfaces having edges 11a and 12a rounded along a predetermined radius of curvature. The shape of battery cell 10 is not limited to the shapes described above and may be modified to have various other shapes, if necessary.

The battery cell also includes twelve edges between the sides of the battery cell 10, at least two of these twelve edges may be rounded. Edge 11a may be a rounded edge that extends in the longest dimensional direction of the battery cell in the Z1 direction between major surface 10a and lateral portion 11, edge 12a may also be a rounded edge that is parallel to edge 11a but is between surface 10a and lateral portion 12, edge 11b also extends in the Z1 direction along a longest dimension of the battery cell between surface 10b and lateral portion 11, and edge 12b extends parallel to edges 11b and 12a but is between surface 10b and lateral portion 12.

Lateral portion 13 has a top edge 13a and a bottom edge 13b, both extending in the Z2 direction or the width direction of the battery cell between lateral portion 13 and major surfaces 10a and 10b respectively, and edges 13x and 13y are arranged at either side of lateral side 13 and extend in the thickness direction Z3 of the battery cell and between lateral portion 13 and lateral portions 11 and 12 respectively. Similarly, lateral portion 14 has a top edge 14a and a bottom edge 14b, both extending in the Z2 direction or the width direction of the battery cell between lateral portion 14 and major surfaces 10a and 10b respectively, and edges 14x and 14y that are arranged at either side of lateral side 14 and extend in the thickness direction Z3 of the battery cell and between lateral portion 14 and lateral portions 11 and 12, respectively.

The battery pack 90 may further include a protection circuit module 50 that is electrically connected to the battery cell 10 and controls a charging and discharging operation of battery cell 10. The protection circuit module 50 may include a circuit substrate 51 including a sensing circuit for detecting state information, such as current and voltage, or a charge-discharge protection circuit for controlling an over-discharge, an over-charge and an over-current condition and a protection element 55 that is connected to the circuit substrate 51 in order to restrict a charge-discharge current in correspondence with a temperature rise. The electrode leads 22 and 23 that extend out from the battery cell 10 may be electrically connected to terminals 52 and 53 disposed on the circuit substrate 51.

The battery pack 90 further includes the casing frame 100 that accommodates the battery cell 10 by surrounding the battery cell 10, and is combined with an outer surface of the battery cell 10. The casing frame 100 may protect the battery cell 10 from external shock and may be used for reinforcing the battery cell 10, the strength of which may affect a charging and discharging operation of the battery cell 10. The casing frame 100 may cover the battery cell 10 so as to protect the battery cell 10 from an external shock, such as a shock due to the battery cell 10 being dropped.

The casing frame 100 provides an accommodation space G that approximately corresponds to the volume of the battery cell 10. The accommodation space G within casing frame 100 may not be a closed space that isolates battery cell 10 from the outside, but may be an open space connected to the outside, and the battery cell 10 may be arranged within the casing frame 100 via the open space that is accessible from the outside.

The casing frame 100 may not constitute a closed accommodation space that surrounds the battery cell 10, but may be shaped as a frame formed along the twelve adjoining edges of a framework of the battery cell 10 so that the battery pack 90 can still be lightweight. In other words, the casing frame 100 is disposed along the framework of the battery cell 10, such as the lateral portions 11, 12, 13 and 14 and the twelve edges that may be easily and detrimentally affected by an external shock, thereby truly protecting the battery cell 10 from the external shock and simultaneously providing a structure that is more suitable for providing a lightweight battery pack 90.

The casing frame 100 may accommodate the battery cell 10 by surrounding a portion of the battery cell 10. In particular, the casing frame 100 may surround the lateral portions 11, 12, 13 and 14 of the battery cell 10 that are vulnerable to damage by an external shock. The casing frame 100 may surround circumferences of the lateral portions 11, 12, 13 and 14 of the battery cell 10, which means that casing frame surrounds the twelve contiguous edges of battery cell 10. The casing frame 100 may include first and second lateral frames 110 and 120 and first and second cover frames 130 and 140, which are disposed in positions corresponding to the lateral portions 11, 12, 13 and 14, respectively, of the battery cell 10.

Since the first and second lateral frames 110 and 120 and the first and second cover frames 130 and 140 constitute lateral portions of the casing frame 100, technical matters regarding the lateral portions of the casing frame 100 may also apply to the first and second lateral frames 110 and 120 and the first and second cover frames 130 and 140. For example, in FIG. 1, the first and second lateral frames 110 and 120 may surround the circumferences of the first and second lateral portions 11 and 12 of the battery cell 10 by encasing edges 11a, 11b, 12a, 12b, and the first and second cover frames 130 and 140 may cover the third and fourth lateral portions 13 and 14 of the battery cell 10 including edges 13a, 13b, 14a and 14b of battery cell, but the combination of the first and second lateral frames 110 and 120 and the first and second cover frames 130 and 140 may also surround the circumferences of the first through fourth lateral portions 11, 12, 13 and 14 of the battery cell 10.

Each of lateral frames 110 and 120 of casing frame 100 are made up of a fixed base portion 112 and 122 respectively that protrudes from opposite edges of base frame 101 in a Z3 or thickness direction, a hinge portion (or folding portion) 111 and 121 respectively arranged along a longitudinal edge of base portion 112 and 122 respectively, and a wing portion 115 and 125 arranged on the hinge portion 111 and 121 respectively, the wing portions 115 and 125 being rotatable with respect to the base portions 112 and 122 and the base frame 101. The hinge portions 111 and 121 support the rotational operation of wing portions 115 and 125, respectively. Each of the hinge portions 111 and 121 along with the wing portions 115 and 125 extend along an entire length of the battery cell 10 in a longest dimension Z1 of the battery cell 10.

Referring now to FIGS. 2 and 3, at least one of hinge portions 111 and 121 are formed on at least one lateral portion of the casing frame 100 in order to support a rotational operation between a first position P1 in which the battery cell 10 can be inserted into and removed from the casing frame 100 and a second position P2 in which the battery cell 10 is surrounded by and encased within casing frame 100. The hinge portions 111 and 121 support the rotational closing of rotating wing portions 115 and 125 by allowing wing portions 115, 125 to rotate from the first position P1 to the second position P2. The rotating wing portions 115 and 125 are opened from a main body of the casing frame 100, for example, a base frame 101, in the first position P1 so as to allow for insertion and removal of the battery cell 10 to and from accommodation space G within the casing frame 100, and are folded onto the base frame 101 in the second position P2 so as to surround and fix the accommodated battery cell 10. Combining of the battery cell 10 with the casing frame 100 may be easily performed by using the hinge portions 111 and 121, and the casing frame 100 is combined to surround the battery cell 10 so that the battery cell 10 may be effectively protected.

In FIGS. 2 and 3, the hinge portions 111 and 121 may be disposed on the first and second lateral frames 110 and 120 of the casing frame 100. The hinge portions 111 and 121 may be formed only on the first and second lateral frames 110 and 120 or additionally on the first and second cover frames 130 and 140 as well as the first and second lateral frames 110 and 120.

The casing frame 100 may include the base frame 101 that extends in a main-side direction (Z1-Z2 plane) of the battery cell 10 and the first and second lateral frames 110 and 120 that protrude from the base frame 101 in a lateral direction (Z3-direction) of the battery cell 10. The base frame 101 may extend along edges of the second main side 10b so as to cover a periphery of the second main side 10b of the battery cell 10 and may include an open area 101' that is in a middle position of the base frame 101 and exposes a middle portion of second main side 10b of the battery cell 10.

The first and second lateral frames 110 and 120 may protrude from the base frame 101 in an upward direction (Z3-direction) and may surround the first and second lateral portions 11 and 12 of the battery cell 10. The first and second lateral frames 110 and 120 cover the lateral portions 11 and 12 of the battery cell 10 by surrounding the circumferences of the lateral portions 11 and 12 of the battery cell 10.

The first and second lateral frames 110 and 120 provide a rotating type open-and-closed structure including the hinge portions 111 and 121. The first and second lateral frames 110 and 120 may include the rotating wing portions 115 and 125 configured to be rotatable between the first position P1 and the second position P2 so that the rotating wing portions 115 and 125 are opened from the base frame 101 to allow for insertion and removal of battery cell 10 from casing frame 100 and may be folded onto the base frame 101 so as to surround and encase battery cell 10 within casing frame 100.

The first and second lateral frames 110 and 120 may include the hinge portions 111 and 121 that are formed in lengthwise directions of the first and second lateral frames 110 and 120. The hinge portions 111 and 121 support the rotating wing portions 115 and 125 to be rotated between the first position P1 and the second position P2 so that the rotating wing portions 115 and 125 may be opened from the base frame 101 and may be folded onto the base frame 101.

The first and second lateral frames 110 and 120 may also include base portions 112 and 122 that are formed in lengthwise directions of the first and second lateral frames 110 and 120. The base portions 112 and 122 support the hinge portions 111 and 121 and are fixed and connected to the base frame 101 and protrude from opposite edges of the base frame to cover edges 11b and 12b and a lower portion of lateral surfaces 11 and 12 of battery cell 100.

For example, the first and second lateral frames 110 and 120 may be disposed to correspond to the first and second lateral portions 11 and 12 so as to cover the first and second lateral portions 11 and 12 of the battery cell 10 that face each other. More particularly, the first and second lateral portions 11 and 12 of the battery cell 10 may have rounded longitudinal edges 11a and 12a having a predetermined radius of curvature, and the first and second lateral frames 110 and 120 may have corresponding rounded longitudinal edges having a predetermined radius of curvature at which the first and second lateral frames 110 and 120 are combined with the first and second lateral portions 11 and 12 and edges 11a and 12a of the battery cell 10, so that the first and second lateral frames 110 and 120 are closely adhered to the circumferences of the first and second lateral portions 11 and 12 of the battery cell 10.

Specifically, when the wing portions 115 and 125 are rotated closed to the second position P2, the wing portions 115 and 125 cover not only the top portion of lateral surfaces 11 and 12 of the battery cell 10, but also curved edges 11a and 12a, and adjoining portions of top major surface 10a of battery cell 10. In contrast, base portions 112 and 122 of lateral frames 110 and 120 cover lower portions of lateral surfaces 11 and 12 of battery cell 10, while base frame 101 covers peripheral portions of major surface 10b of battery cell 10b, while base frame 101 together with the base portions 112 and 122 of lateral frames 110 and 120 cover edges 11a and 12a respectively of battery cell 10, thereby protecting the battery cell from damage upon being dropped.

For example, the first and second lateral portions 11 and 12 of the battery cell 10 may be shaped as a semi-circle that follows a predetermined radius of curvature, and the first and second lateral frames 110 and 120 may also have semi-circular shaped curved surfaces on which the first and second lateral frames 110 and 120 are combined with the first and second lateral portions 11 and 12 of the battery cell 10, so that the first and second lateral frames 110 and 120 are closely adhered to each other along the circumferences of the first and second lateral portions 11 and 12 of the battery cell 10.

In an embodiment of the present invention, the first and second lateral frames 110 and 120 that face each other provide a rotating open-and-closed structure configured to be rotatable between the first position P1 and the second position P2 so that the rotating open-and-closed structure is opened from the base frame 101 to allow for insertion and removal of the battery cell 10 and is folded onto the base frame 100 (onto the battery cell 10) so that the first and second lateral frames 110 and 120 are closely adhered to the battery cell 10. The rotating open-and-closed structure surrounds a portion of the battery cell 10 to effectively protect the battery cell 10 from an external shock and to easily accommodate the battery cell 10 within the casing frame 100. In detail, the battery cell 10 may be easily inserted into and accommodated within accommodating space G within the casing frame 100 while the rotating wing portions 115 and 125 are in the first position P1 without any physical interference from the casing frame 100, and may be truly protected from an external shock via the first and second lateral frames 110 and 120 being combined with the first and second lateral portions 11 and 12 of battery cell 10 upon rotating wing portions 115 and 125 to second position P2.

In another embodiment of the present invention, the rotating open-and-closed structure may also apply only to either one selected from the first and second lateral frames 110 and 120. For example, the first lateral frame 110 may be fixed to the base frame 101, and the second lateral frame 120 may have a rotating open-and-closed structure. In the rotating open-and-closed structure described above, the battery cell 10 may be easily received into and accommodated within the casing frame 100 without any physical interference from the casing frame 100 via the rotating open-and-closed structure of the second lateral frame 120. Also, the casing frame 100 that is combined with the outer surface of the battery cell 10 by surrounding the battery cell 10 may be truly protected from external shock of impulse via the rotating open-and-closed structure of the second lateral frame 120.

The casing frame 100 may be formed using injection molding by injecting an insulating resin material into a case-shaped mold frame in order to form casing frame 100. In this regard, the rotating open-and-closed structure is provided to the first and second lateral frames 110 and 120 of the casing frame 100 so that the efficacy of injection molding is improved. For example, the casing frame 100 is formed by inserting a core (not shown) as the mold frame and then, the core (not shown) is removed from the casing frame 100 when the molding operation is completed. The rotating open-and-closed structure is provided to the first and second lateral frames 110 and 120 of the casing frame 100 so that the core (not shown) can be easily removed from the casing frame 100 without any deformation of the shape of the casing frame 100.

The casing frame 100 may further include the first and second cover frames 130 and 140 that cover the third and fourth lateral portions 13 and 14 of the battery cell 10. The first and second cover frames 130 and 140 may protrude from the base frame 101 in the thickness direction (Z3-direction) of the battery cell 10 and may extend across the third and fourth lateral portions 13 and 14 of the battery cell 10 so as to cover the third and fourth lateral portions 13 and 14 of the battery cell 10. The first and second cover frames 130 and 140 cover the third and fourth lateral portions 13 and 14 of the battery cell 10, thereby protecting the battery cell 10 and reinforcing structural rigidity of the battery cell 10.

Referring to FIG. 1, the cover frames 130 and 140 may include the first and second cover frames 130 and 140 that face each other. The first cover frame 130 may cover the third lateral portion 13 of the battery cell 10, and the second cover frame 140 may cover the fourth lateral portion 14 of the battery cell 10. For example, the first cover frame 130 may cover the protection circuit module 50 that is electrically connected to the battery cell 10 and may also cover the third lateral portion 13 of the battery cell 10 from which the electrode leads 22 and 23 extend, as well as the protection circuit module 50 of the battery pack 90. The second cover frame 140 may cover the fourth lateral portion 14 that forms a base surface opposite from the electrode leads 22 and 23 of the battery cell 10.

The first and second cover frames 130 and 140 may protrude from the base frame 101 by first and second heights h3 and h4 respectively. For example, the first height h3 may be relatively lower than the second height h4. The first and second heights h3 and h4 of the first and second cover frames 130 and 140 are different from each other in this way, so that the battery cell 10 may be easily inserted into the casing frame 100 while preventing the casing frame from physically interfering with battery cell 10. This will be described in detail below.

The casing frame 10 further includes a lip, referred to herein as stopper, or flange 141, that protrudes from the outer surface of the battery cell 10 may be formed on the second cover frame 140 so as to prevent the battery cell 10 from escaping from the second cover frame 140. The stopper, or flange 141, may protrude from the edge of an intermediate portion along the inside of second cover frame 140 in the length direction Z1, and may include a surface within mainside direction (Z1-Z2 plane direction) of the battery cell 10.

The casing frame 100 may be produced using injection molding by injecting a polymer resin material molten at a high temperature into the case-shaped mold to be formed. For example, the casing frame 100 may be formed of an electrically insulating polymer resin, such as polypropylene (PP).

Figure 6:
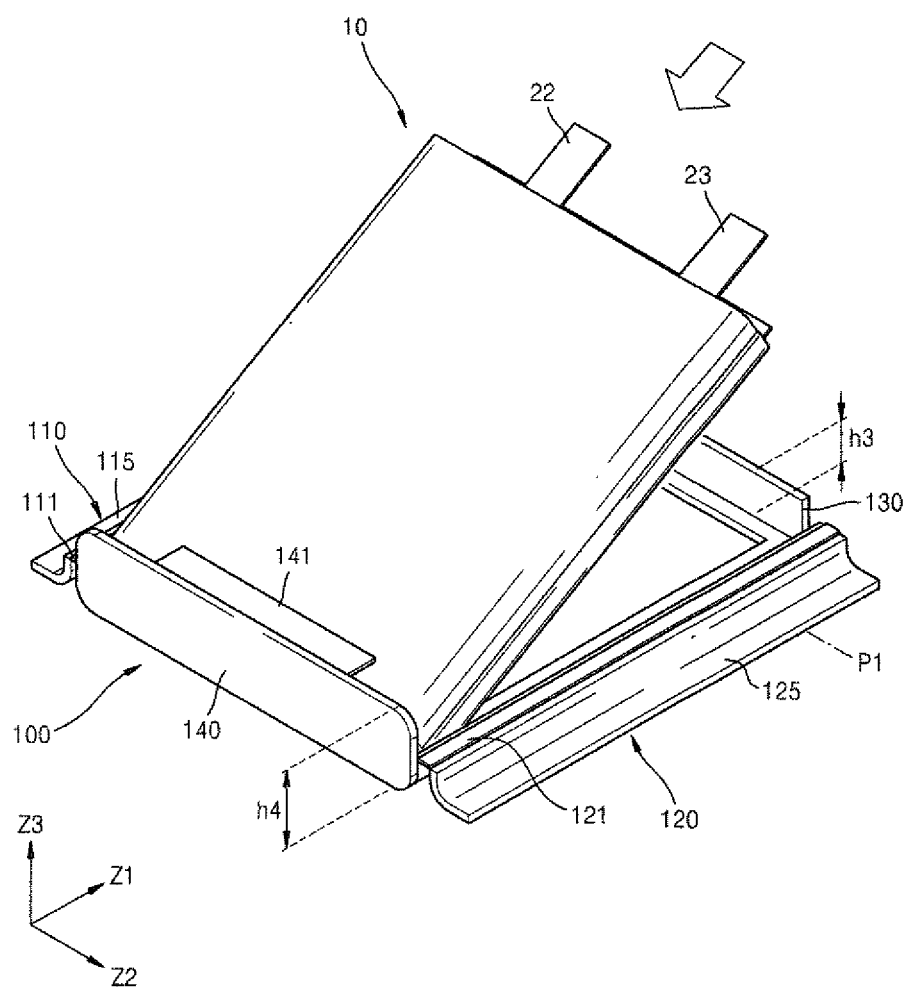
FIG. 6 is an oblique view of an operation for mounting a battery cell within the casing frame.

Turning now to FIG. 6, FIG. 6 is a perspective view of an operation of combining the battery cell 10 and the casing frame 100. Referring to FIG. 6, combining of the battery cell 10 and the casing frame 100 is performed in such a way that the battery cell 10 is inclined at an oblique angle and one lateral portion 14 of the battery cell 10 leans on the second cover frame 140 and then the battery cell 10 is disposed in the casing frame 100 and is mounted therein. In this case, the first height h3 of the first cover frame 130 at which barrier walls are formed when the battery cell 10 is received into the casing frame 100 is relatively lower than the second height h4 so that the battery cell 10 is easily received into the casing frame 100 without interfering with the first cover frame 130.

Figure 7:
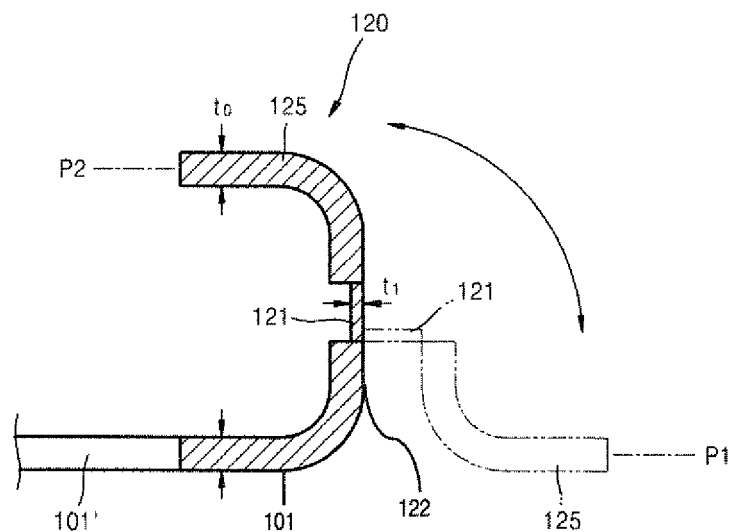
FIGS. 7 and 8 are cross-sectional views of alternative designs for details of hinge portions constructed for embodiments of the present invention.
Figure 8:
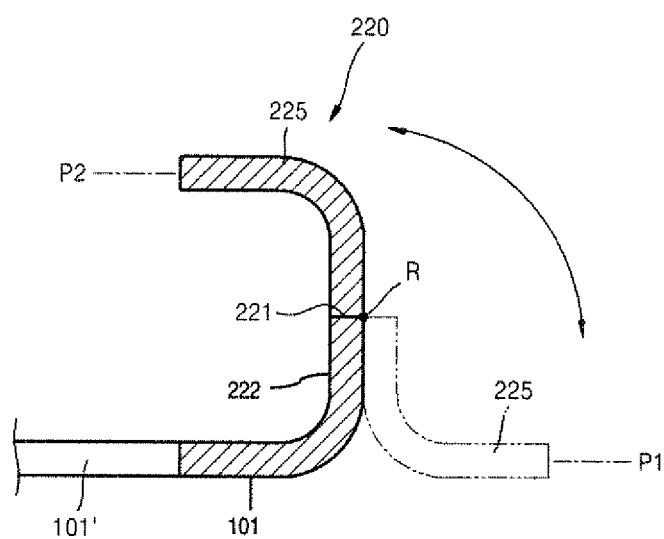

Turning now to FIGS. 7 and 8, FIGS. 7 and 8 are cross-sectional views of the hinge portions 121 and 221 constructed as embodiments of the present invention. Referring to FIGS. 7 and 8, the hinge portions 121 and 221 represent a discontinuous shape formed on the first and second lateral frames 110 and 120. More specifically, each of the hinge portions 121 and 221 may include either a thin portion 121 illustrated in FIG. 7, or a cutting a portion 221 of lateral frame 220 at mid-width in order to form pivot R from the exterior surface of lateral frame 220, as is illustrated in FIG. 8. As illustrated in FIG. 7, the hinge portion 121 may be formed as a thin portion that has a reduced thickness t1 compared to a thickness t0 along a remainder of the second lateral frame 120, and may be easily modified to support the rotational operation of the rotating wing portion 125 between the first and second positions P1 and P2 by forming a minimum thickness t1 that is smaller than the thickness t0 of adjoining other portions 122, 125 of the second lateral frame 120.

As illustrated in FIG. 8, the hinge portion 221 constructed as another embodiment may be formed as a residual of the exterior surface material that has not been cut from the exterior surface of the second lateral frame 120 by a predetermined thickness and may be easily modified to support the rotational operation of the rotating wing portion 225 between the first and second positions P1 and P2 via a pivot portion R of the exterior surface that is not cut.

Figure 9:
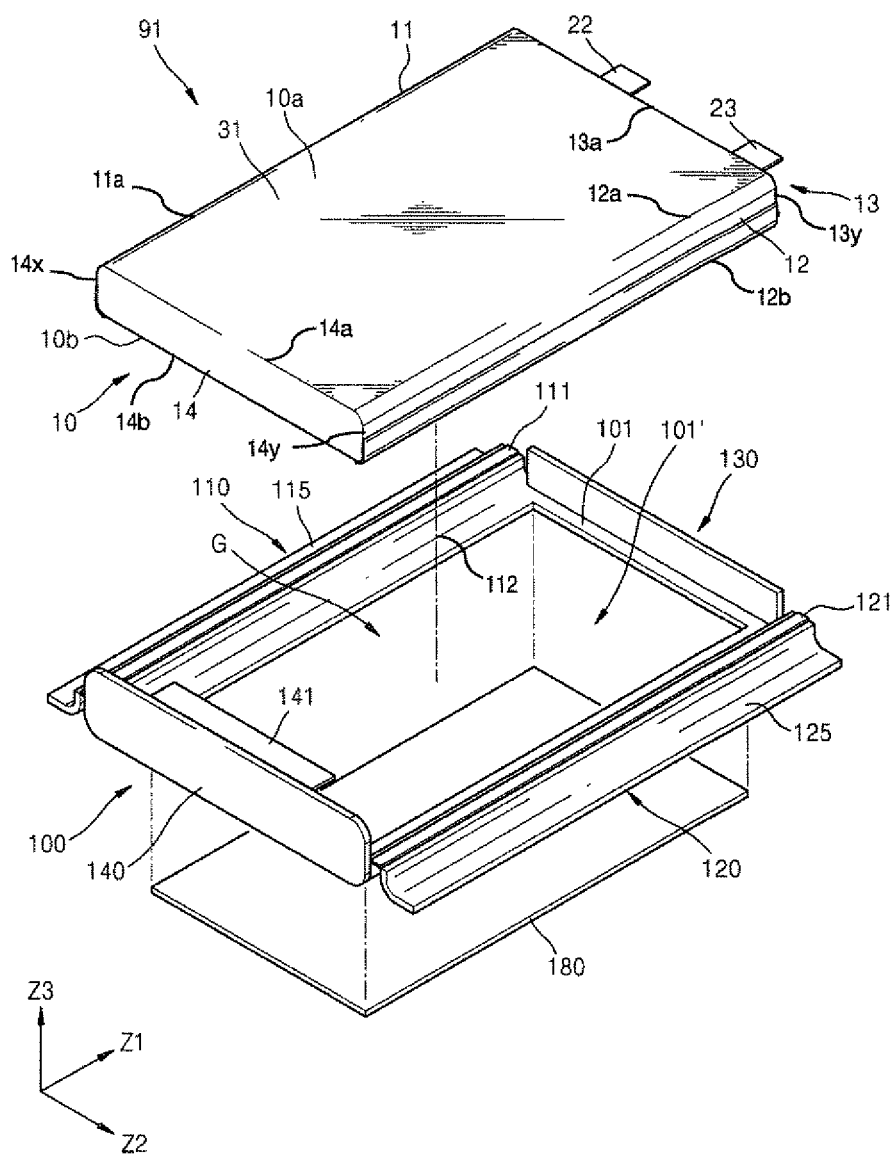
FIG. 9 is an exploded assembly view of a battery pack constructed as another embodiment of the present invention.

Turning now to FIG. 9, FIG. 9 is an exploded assembly view of a battery pack 91 constructed as another embodiment of the present invention. Referring to FIG. 9, the battery pack 91 includes a battery cell 10 and a casing frame 100 that receives and accommodates the battery cell 10 by surrounding the exterior surfaces of battery cell 10. The casing frame 100 includes a base frame 101 that covers a portion of the second main side 10b of the battery cell 10 and first and second lateral frames 110 and 120 that extend from the base frame 101 and include rotating wing portions 115 and 125 supported to be rotatable.

An opening area 101' for exposing a portion of the second main side 10b of the battery cell 10 is located in the base frame 101 of the casing frame 100, and the battery cell 10, i.e., the second main side 10b of the battery cell 10, exposed from the base frame 101, is padded with a reinforcement plate 180. The reinforcement plate 180 may be used for reinforcing the battery cell 10 exposed from the casing frame 100 to the protect battery cell 10 from damage which would be caused from an external shock or impulse.

The second main side 10b of the battery cell 10 exposed by opening area 101' of base frame 101 may have a predetermined stepped part with respect to the base frame 101, for example, a stepped part corresponding to the thickness of the base frame 101. The main side 10b of the battery cell 10 is padded with the reinforcement plate 180 so that the stepped part is removed from the second main side 10b of the battery cell 10 and the appearance of the battery pack 91 is improved. As will be described below, the position of the reinforcement plate 180 may be fixed by an outer cover (see 190 of FIG. 10) attached to the casing frame 100 along a circumference of the casing frame 100. The reinforcement plate 180 may be a metallic plate, such as an aluminum plate.

Figure 10:
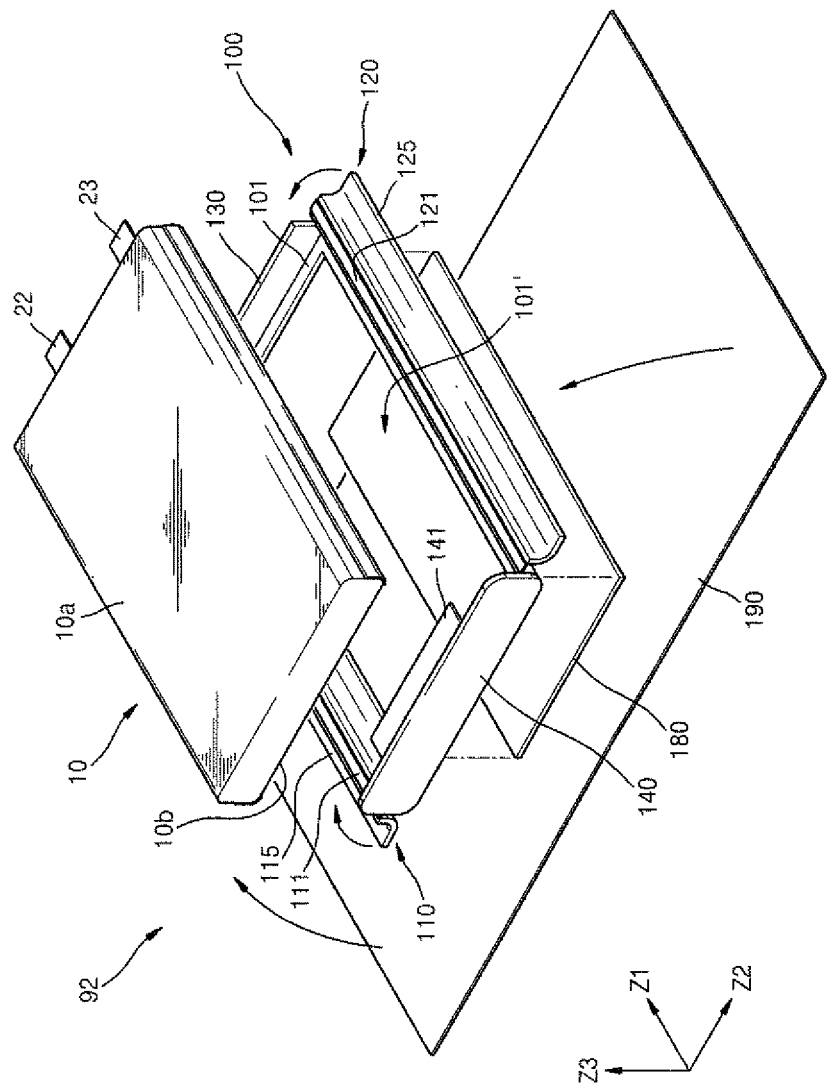
FIG. 10 is an exploded assembly view of a battery pack constructed as another embodiment of the present invention.

Turning now to FIG. 10, FIG. 10 is an exploded assembly view of a battery pack 92 constructed as another embodiment of the present invention. Referring to FIG. 10, the battery pack 92 may include a battery cell 10, a casing frame 100 that is combined with an outer surface of the battery cell 10, and an outer cover 190 that allows the battery cell 10 and the casing frame 100 to be combined with each other.

The outer cover 190 may be wound to surround the casing frame 100 in a circumferential direction of the casing frame 100. The outer cover 190 may allow the battery cell 10 and the casing frame 100 to be combined with each other and may improve an appearance of the casing frame 100. The outer cover 190 may insulate the battery cell 10 from the external environment and may be an electrically insulating sheet having an adhesive layer (not shown).

The casing frame 100 may include rotating wing portions 115 and 125 that are supported by hinge portions 111 and 121 and configured to be rotatable between opened and closed positions. The outer cover 190 may be wound on the circumference of the casing frame 100 in a direction parallel to a direction of a rotational displacement of the rotating wing portions 115 and 125. Thus, the outer cover 190 may confine the rotating wing portions 115 and 125 and allow the rotating wing portions to be closely adhered to the battery cell 10, and the rotating wing portions 115 and 125 may be pressed against the battery cell 10 due to tension of the outer cover 190.

The battery pack 92 may further include a reinforcement plate 180 padded on the second main side 10b of the battery cell 10 exposed from an opening area 101' of the casing frame 100. The reinforcement plate 180 may be wound by the outer cover 190 so that it is fixed to the outer surface of the battery cell 10.

Hereinafter, a method of manufacturing a battery pack as an exemplary embodiment of the present invention will be described.

First, as illustrated in FIG. 1, a battery cell 10 is prepared. The battery cell 10 is prepared to be shaped as a pouch for sealing an electrode assembly 35 and an electrolyte (not shown) by using a sealing member 31, such as a laminate sheet. The electrode assembly 35 may include an anode plate (not shown) and a cathode plate (not shown), and a separator (not shown) interposed between the anode plate (not shown) and the cathode plate (not shown) and may have various structures including a stack type structure, a winding type structure, and the like.

Next, a casing frame 100 is prepared. The casing frame 100 may accommodate the battery cell 10 by surrounding the battery cell 10. The casing frame 100 may include a base frame 101 that extends in a main-side direction (Z1-Z2 plane) of the battery cell 10 and first and second lateral frames 110 and 120 that extend in a lateral direction (Z3-direction) of the battery cell 10 from the base frame 101. The casing frame 100 may further include first and second cover frames 130 and 140. Hinge portions 111 and 121 may be formed along the first and second lateral frames 110 and 120, and rotating wing portions 115 and 125 supported by the hinge portions 111 and 121 may be configured to be rotatable between a first position P1 and a second position P2 so that they are opened from the base frame 101 so as to accommodate the battery cell 10 and are folded onto the base frame 101, i.e., onto the battery cell 10, so as to be closely adhered to the accommodated battery cell 10.

Next, the battery cell 10 and the casing frame 100 are combined with each other. In this case, the casing frame 100 accommodates the battery cell 10 by surrounding the battery cell 10 and is combined with the outer surface of the battery cell 10. More specifically, the operation of combining the casing frame 100 to the battery cell 10 is performed as below.

As illustrated in FIG. 2, the rotating wing portions 115 and 125 of the casing frame 100 are rotated in the first position P1 so that the rotating wing portions 115 and 125 are opened from the base frame 101 and the battery cell 10 may be inserted and received into and be accommodated within the casing frame 100 without any physical interference from the casing frame 100. In this regard, as illustrated in FIG. 6, when the rotating wing portions 115 and 125 of the first and second lateral frames 110 and 120 lean back in the first position P1, the battery cell 10 is received into the casing frame 100 at an oblique angle so that lateral portion 14 of the battery cell 10 leans on the second cover frame 140 via the first cover frame 130. In this case, lateral portion 14 of the battery cell 10 may lean on the second cover frame 140 and simultaneously the battery cell 10 may be combined with the stopper such as a flange 141 of the second cover frame 140 and may be prevented from escaping from the combining position.

Next, as illustrated in FIG. 3, the rotating wing portions 115 and 125 are rotated to second position P2 so that the rotating wing portions 115 and 125 are folded onto the battery cell 10. In this case, the rotating wing portions 115 and 125 may be disposed in the battery cell 10 by surrounding first and second lateral portions 11 and 12 of the battery cell 10.

Next, as illustrated in FIG. 10, the battery cell 10 and the casing frame 100 may be combined to each other. For example, the outer cover 190 is attached to the casing frame 100 along a circumference of the casing frame 100 that accommodates the battery cell 10 so that the battery cell 10 and the casing frame 100 are combined to each other.

For example, the outer cover 190 may be wound to surround the casing frame 100 in the circumferential direction of the casing frame 100. The outer cover 190 may allow the battery cell 10 and the casing frame 100 to be combined to each other and may prevent a defect of the appearance of the casing frame 100. The outer cover 190 may insulate the battery cell 10 from the external environment and may be an insulating sheet having an adhesive layer (not shown).

The outer cover 190 is attached to the casing frame 100 in such a way that the outer cover 190 confines the rotating wing portions 115 and 125 and is closely adhered to the battery cell 10 so that the rotating wing portions 115 and 125 are pressed against the battery cell 10 due to tension of the outer cover 190.

For example, a direction in which the outer cover 190 is attached to the casing frame 100 may be set as a direction parallel to a direction of a displacement of the rotating wing portions 115 and 125 defined by the first position P1 and the second position P2. In other words, the outer cover 190 may be attached to the frame base 100 to surround the circumference of the casing frame 100 in a direction of a displacement of the rotating wing portions 115 and 125 defined by the first position P1 and the second position P2. The rotating wing portions 115 and 125 may be pressed against and closely adhered to the battery cell 10 due to tension of the outer cover 190.

An operation of padding a reinforcement plate 180 on the casing frame 100 or on the battery cell 10 exposed from the casing frame 100 may be additionally performed before the outer cover 190 is attached to the casing frame 100. For example, the reinforcement plate 180 may be padded on the second main side 10b of the battery cell 10 that is exposed from the casing frame 100. The reinforcement plate 180 may be used for reinforcing the battery cell 10 exposed from the casing frame 100 to protect it from an external shock.

The reinforcement plate 180 may also be used to improve the appearance of a battery pack. The reinforcement plate 180 may be padded on a main side of the battery cell 10 exposed from the casing frame 100, i.e., on the second main side 10b of the battery cell 10 exposed to the outside via the opening area 101' of the casing frame 100. For example, a stepped part corresponding to the thickness of the base frame 101 may be formed between the base frame 101 and the main side 10b of the battery cell 10 exposed by the base frame 101. The reinforcement plate 180 is padded on the second main side 10b of the battery cell 10 so that the stepped part is removed from the second main side 10b of the battery cell 10 and the appearance of the battery pack is improved. The reinforcement plate 180 may be a metallic plate, such as an aluminum plate, and the outer cover 190 to be wound around the circumference of the casing frame 100 may be attached to the outer surface of the reinforcement plate 180.

According to an embodiment of the present invention, the casing frame 100 is configured so that the rotating wing portions 115 and 125 are rotated between the first position P1 in which the battery cell 10 is accommodated and the second position P2 in which the battery cell 10 is surrounded, so that the operation of combining the battery cell 10 and the casing frame 100 is easily performed and shock resistance of the battery pack is improved via the casing frame 100 configured to surround a lateral circumference of the battery cell 10 that is vulnerable to the external shock.

In particular, the pouch type battery cell 10 is vulnerable to damage attributable to an external shock or impulse and may be deformed due to external pressure so as to badly affect a charging and discharging performance of the battery cell 10. In the embodiments of the present invention, battery cell 10 is protected from external impulses and shock, and the appearance of the battery cell 10 is maintained by the casing frame 100 so that a stable charging and discharging operation may be ensured.

In a comparative embodiment in which a battery cell is disposed in a rectangular frame, a gap between the battery cell and the rectangular frame is filled and a formation resin is injected into the rectangular frame so that the rectangular frame is combined with or closely adhered to a rounded curved surface of the battery cell, as the formation resin is injected at a high temperature of 240° C., the battery cell may be thermally damaged, and injection molding for injecting an additional formation resin needs to be performed, resulting in working efficiency being lowered. Contrary to this, according to the present invention, by using the rotating open-and-closed structure configured to be rotatable between the first position P1 in which the battery cell 10 is accommodated and the second position P2 in which the battery cell 10 is surrounded, the battery cell 10 may be easily combined with the casing frame 100, and the casing frame 100 may be combined with or closely adhered to a rounded curved surface of the battery cell 10 so that the battery cell 10 may be truly protected. In this practice of the principles of these inventions, a battery cell may be fabricated with a pouch battery cell and a casing frame accommodating and securely surrounding and embracing the battery cell. The casing frame may include a base frame corresponding to a first main surface of the battery cell, a first lateral frame protruding from one edge of the base frame and corresponding to a narrow lateral surface of the battery cell that may extend along an entire length of a longest dimensional direction of the battery cell, with the first lateral frame including a hinge portion that may extend along an entire length of the longest dimensional direction of the battery cell and a wing portion that is arranged on the hinge portion to be rotatable with respect to the base frame, between a first position where the battery cell can be inserted into, and if necessary, removed from, the casing frame, and a second position where the battery cell is surrounded by and secured within the casing frame. The hinge portion enables the wing portion to be rotatable. The wing portion, which may cover a portion of the narrow, lateral surface of the battery cell and an adjoining portion of a second major surface of the battery cell that is opposite to the first major surface of the battery cell, may be formed with a rounded curved surface that mates with a corresponding rounded curved surface of the battery cell that extends along an entire length of a first dimensional direction of the battery cell when the wing portion is in the second position. A second lateral frame may be arranged on an opposite side of the base frame from the first lateral frame and face the first lateral frame, with the first and second lateral frames respectively surrounding first and second long, narrow lateral surfaces of the battery cell.

As described above, according to the present invention, a casing frame may be fabricated to be rotatable between a first position in which a battery cell can be inserted, or if necessary, removed, and a second position in which the battery cell is surrounded and locked into place, so that an assembly of the battery cell and the casing frame may be easily performed during manufacture. In addition, the casing frame is configured to surround a lateral circumference of the battery cell that is vulnerable to an external shock so that shock resistance of a battery pack may be improved.

In particular, a pouch type battery cell that is sealed by a flexible sealing member, is vulnerable to an external shock and may be deformed due to external pressure so as to badly affect the performance of the battery cell during charging and discharging cycles, is protected from the external shock by having the casing frame, and the battery cell is supported by the casing frame so that a stable charging and discharging operation may be guaranteed.

In addition, according to the present invention, a complicated process, such as injection molding, does not need to be performed to form a structure of a casing frame to be combined with or closely adhered to a rounded curved surface of the battery cell. Instead, by performing a simple combining operation, a casing frame to be closely adhered to the rounded curved surface of the battery cell may be formed, and thermal damage to the battery cell caused by an injection of a high-temperature formation resin may be prevented.

It will be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack, comprising:
a pouch battery cell having a first main side opposite a second main side;
a casing frame accommodating and surrounding the battery cell, the casing frame including:
a base frame corresponding to the second main surface of the battery cell, wherein the base frame of the casing frame is perforated by an aperture to expose a majority of the second main side of the battery cell to an outside of the casing frame,
a first lateral frame protruding from one edge of the base frame and corresponding to a lateral surface of the battery cell that extends along an entire length of a first dimensional direction of the battery cell, the first lateral frame including
a hinge portion extending along an entire length of the first dimensional direction of the battery cell and a wing portion arranged on the hinge portion and being rotatable between a first position where the battery cell can be inserted into the casing frame and a second position where the battery cell is surrounded by and secured within the casing frame, wherein the hinge portion comprises a structure selected from a group consisting of a thin portion having a reduced thickness in the first lateral frame and a cut portion that is cut from a surface of the first lateral frame of the casing frame, the hinge portion to provide a pivot for the wing portion to rotate between the first and second positions and provide an open and closed structure for the frame case, the casing frame being comprised of a polymer resin that is produced by an injection molding process; and
an outer cover attached along an entire circumference of the casing frame, the outer cover comprising an electrically insulating sheet having an adhesive layer, the outer cover being wound about the circumference of the casing frame in a direction parallel to a direction of a rotation of the wing portion.

2. The battery pack of claim 1, comprised of the wing portion covering a portion of the narrow, lateral surface of the battery cell and an adjoining portion of the first main side of the battery cell that is opposite to the second main side of the battery cell, the second main side of the battery cell facing the base frame and being in contact with the base frame while the first main side of the battery cell faces away from the base frame and is spaced apart from the base frame.

3. The battery pack of claim 1, wherein the wing portion comprises a rounded curved surface that mates with a corresponding rounded curved surface of the battery cell that extends along an entire length of a first dimensional direction of the battery cell when the wing portion is in the second position.

4. The battery pack of claim 1, the casing frame further comprising a second lateral frame arranged on an opposite side of the base frame from the first lateral frame to face the first lateral frame, the first and second lateral frames surrounding first and second long, narrow lateral surfaces respectively of the battery cell.

5. The battery pack of claim 4, wherein the second lateral frame comprises:
a hinge portion extending along a length of the second lateral frame; and
a wing portion attached to the hinge portion to rotate with respect to the base frame, the hinge portions of the second lateral frame to provide for a rotating open and closed structure to allow for removal of the pouch battery cell from the casing frame without any deformation of a shape of the casing frame.

6. The battery pack of claim 4, wherein the casing frame further comprises first and second cover frames that face each other and that protrude from the base frame to cover third and fourth lateral surfaces of the battery cell that are positioned between the first and second lateral surfaces of the battery cell.

7. The battery pack of claim 6, wherein each of the first and second cover frames protrudes from the base frame by different heights.

8. The battery pack of claim 6, the casing frame further comprises a flange arranged on the second cover frame and oriented to prevent the battery cell from escaping from the casing frame, the second cover frame having a proximal edge that attaches to the base frame and a distal and opposite edge that attaches to the flange, the flange being parallel to the base frame and extending towards the first cover frame from the second cover frame.

9. A battery pack, comprising:
a pouch battery cell having two major surfaces opposite to each other and four lateral surfaces forming a circumference of the battery cell between the two major surfaces; and
a casing frame accommodating and surrounding the battery cell, the casing frame including a base frame corresponding to one of the two major surfaces of the battery cell, two lateral frames extending from opposing edges of the base frame, the two lateral frames each including a wing portion that is rotatable with respect to the base frame about a hinge portion, each wing portion having a length that conforms to a length of two opposing and longest of the four lateral surfaces of the battery cell, each wing portion being rotatable from a first position where the battery cell can be inserted into the casing frame to a second position where the battery cell is surrounded by secured and embraced by the wing portions within the casing frame, each hinge portion being a discontinuous shape arranged in each of the two lateral frames to provide a pivot about which each wing portion rotates with respect to the base frame, wherein each hinge portion comprises a structure selected from a group consisting of a thin portion having a reduced thickness in each lateral frame and a cut portion that is cut from a surface of each lateral frame of the casing frame, each hinge portion to provide a pivot for the wing portion to rotate between the first and second positions; and
an outer cover attached along an entire circumference of the casing frame, the outer cover comprising an electrically insulating sheet having an adhesive layer, the outer cover being wound about the circumference of the casing frame in a direction parallel to a direction of a rotation of the wing portion.

10. The battery pack of claim 9, wherein each hinge portion comprises the thin portion having a wall thickness that is less than remaining portions of a corresponding lateral frame.

11. The battery pack of claim 9, wherein each hinge portion comprises the cut portion that is cut through from an inner surface of a corresponding lateral portion and includes the pivot at an outer surface of the lateral portion at a location that corresponds to the cut portion.

12. The battery pack of claim 9, the casing frame being comprised of a polymer resin material and being produced by an injection molding process.

13. The battery pack of claim 1, further comprising a reinforcement plate arranged on the exposed portion of the second main side of the battery cell, the reinforcement plate being padded on a side facing the second main side of the battery cell, the outer cover being also attached to an external side of the reinforcement plate.

14. The battery pack of claim 6, further comprising a protection circuit module arranged over the fourth lateral surface of the battery cell and electrically connected to an anode lead and a cathode lead extending from the fourth lateral surface of the battery cell, the second cover frame covering the protection circuit module.

15. The battery pack of claim 9, wherein the base frame of the casing frame is perforated by an aperture to expose a majority of the one of the two major surfaces of the battery cell to an outside of the casing frame.

16. The battery pack of claim 15, further comprising a reinforcement plate arranged on the exposed portion of the one of the two major surfaces of the battery cell, the reinforcement plate being padded on a side facing the one of the two major surfaces of the battery cell, the outer cover being also attached to an external side of the reinforcement plate.

* * * * *